United States Patent [19]

Windsor

[11] Patent Number: 4,518,064
[45] Date of Patent: May 21, 1985

[54] CLUTCH CONTROL MEANS

[75] Inventor: Harry M. Windsor, Harbury, England

[73] Assignee: Automotive Products Limited, Leamington Spa, England

[21] Appl. No.: 338,164

[22] Filed: Jan. 8, 1982

[30] Foreign Application Priority Data

Jan. 30, 1981 [GB] United Kingdom ............... 8103325

[51] Int. Cl.³ .............................................. B60K 41/22
[52] U.S. Cl. ................................. 192/3.58; 192/0.052
[58] Field of Search ............... 192/0.076, 0.092, 0.052, 192/3.58, 3.59, 3.56; 74/866

[56] References Cited

U.S. PATENT DOCUMENTS

| 4,195,720 | 4/1980 | Usui et al. | 192/3.58 X |
| 4,281,751 | 8/1981 | Suga et al. | 192/3.59 |
| 4,294,341 | 10/1981 | Swart | 74/866 X |
| 4,295,551 | 10/1981 | Zimmerman et al. | 74/866 |
| 4,373,619 | 2/1983 | Schritt et al. | 192/0.052 |

FOREIGN PATENT DOCUMENTS

| 820395 | 9/1959 | United Kingdom . |
| 1281040 | 7/1972 | United Kingdom . |
| 1343807 | 1/1974 | United Kingdom . |
| 1363220 | 7/1974 | United Kingdom . |
| 1365036 | 8/1974 | United Kingdom . |
| 1377437 | 12/1974 | United Kingdom . |

Primary Examiner—George H. Krizmanich
Attorney, Agent, or Firm—Kemon & Estabrook

[57] ABSTRACT

A vehicle transmission clutch control including an electronic logic control which controls the transmission gear selection, a clutch position signal generator responsive to vehicle operating parameters to produce a command signal which operates a clutch control to govern the engagement of the clutch.

A clutch disengagement control receives a gear change signal from the logic control and produces an output signal that can override the command signal to cause the control system to disengage the clutch. The output signal is caused to vary during a gear change and thereby alters the command signal and cause the clutch engagement to vary over the gear change period.

6 Claims, 5 Drawing Figures

CLUTCH CONTROL MEANS

This invention relates to vehicle transmission clutch controls which are electronic in nature.

In our published British Patent Specification No. 1 420 307 and its Patent of Addition No. 1 531 434 we have described an automatic gearbox electronic control. We have found that during automatic gear changes the actual mechanism of the clutch operation is lower than is desired. Therefore, the present invention is concerned with reducing the time taken for clutch engagement and disengagement by using electronic means to allow the plate to disengage rapidly when it does not matter and slowly during critical periods, ie. when the driven plate is just separating from and moving up to engage the friction surfaces on the drive members respectively.

Accordingly there is provided a vehicle transmission clutch control including an electronic logic control which is responsive to transmission operating parameters to control selection of the appropriate gear ratio, a clutch position signal generator responsive to vehicle operating parameters and producing a command signal which operates a clutch control system which governs the state of engagement of the clutch, characterised in that a clutch disengagement control responsive to a gear change signal from the logic control, produces an output signal capable of overriding the command signal, and causes the clutch control to disengage the clutch, and said output signal is caused to vary during the gear change period and thereby alter the command signal and cause the state of engagement of the clutch to vary over said period.

Preferably the disengagement control includes an integrator comprising an amplifier which is connected to the logic control via an inverting input, and has its output connected to the command signal, and a capacitor connected across the amplifier output and said input, and the gear change signal causes a change in the polarity of the amplifier input thereby causing a change in the charge in the capacitor and a subsequent change in the output signal.

Conveniently the rate of change of the charge in the capacitor is changed by altering the total resistance of the capacitor charging circuit once a predetermined change in amplifier output has taken place, by switching a resistance in or out of said circuit.

The invention will be described by way of example and with reference to the accompanying drawings in which.

Figure 1:
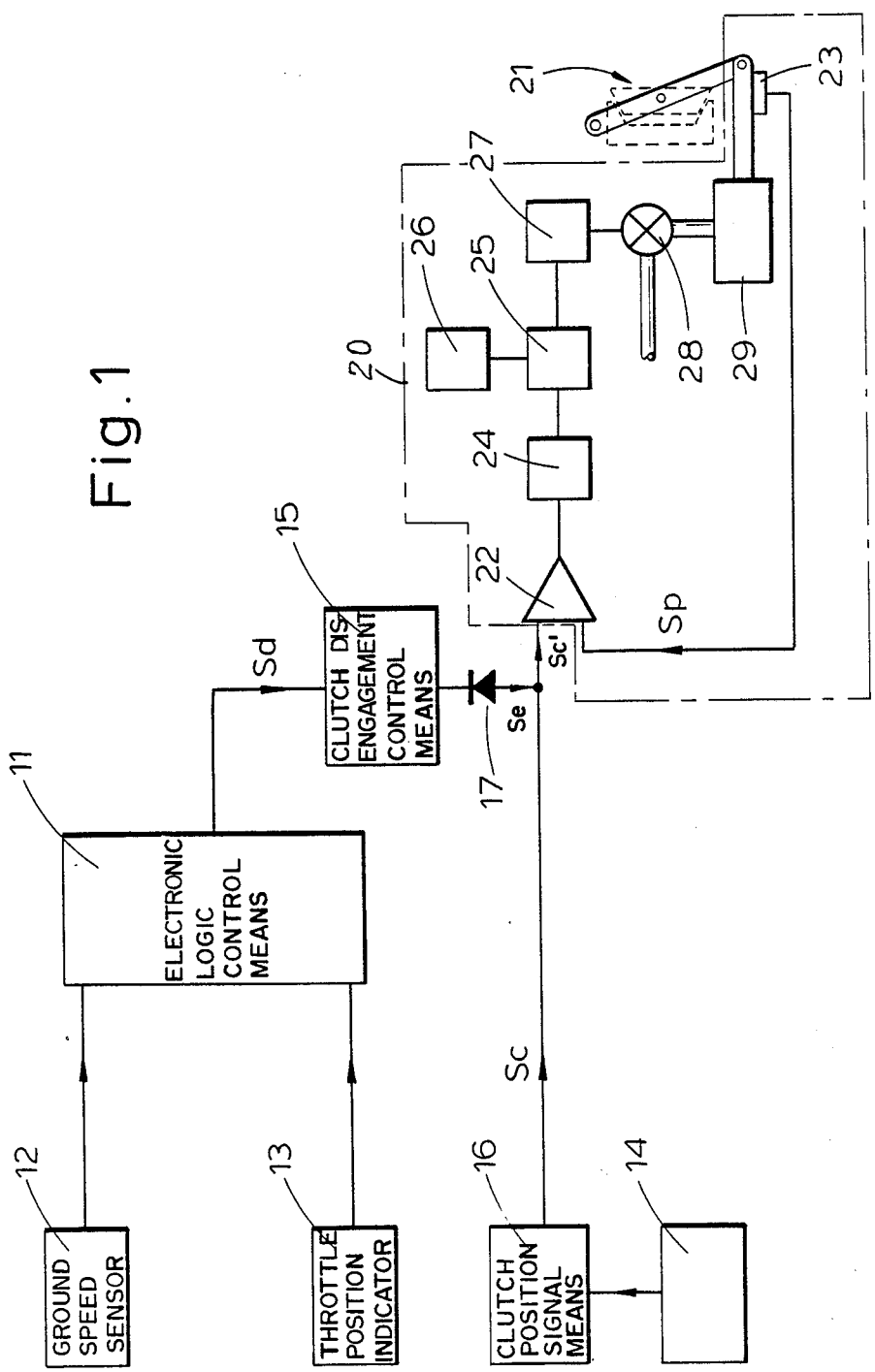
FIG. 1 is a schematic drawing of a clutch control system according to the invention.

With reference to FIG. 1 of the drawings, a vehicle automatic transmission is controlled for its gear ratio selection by electronic logic control 11. The logic control 11 means hereinafter referred to as logic control is responsive to transmission operating parameters particularly vehicle ground speed and engine throttle opening and to this end is supplied with signals from a ground speed sensor 12, and throttle position indicator 13.

The logic control 11 controls the selection of the appropriate gearbox ratio in accordance with the input signal which it receives so that gear selection is automatic. The ratio selection may be overridden by the use of a gear selector lever (not shown) which would also supply an input signal to the logic control. Such a system is fully described in our British Patent Specification No. 1 420 307 and its Patent of Addition No. 1 531 434. When the logic control 11 changes the gear ratio a clutch disengagement signal Sd is sent to a clutch disengagement control means 15.

The engagement of the vehicle clutch 21 is controlled by a clutch control means in the form of a control loop 20. The control loop comprises a comparator 22 which receives a command signal Sc or modified command signal Sc' for comparison with a clutch position feed back signal Sp from a travel transducer 23 responsive to clutch position. The command signal Sc is produced by a clutch position signal means, namely a clutch position control signal generator 16 responsive to vehicle operating parameters fed thereto from unit 14 and may be modified by a signal Se which is the output signal from the disengagement control 15 to produce a modified command signal Sc'. The signal Se from the disengagement control 15 can, as will be described, override the command signal Sc from the generator 16 and hence dictate the state of engagement of the clutch.

The output signal from the comparator 22 is fed into a phase-gain shaping network 24, introduced to ensure the system stabability, a mark space ratio modulator and oscillator, 25 and 26 respectively, and is then utilised via an output 27 to control a solenoid valve 28. The solenoid valve controls the hydraulic flow in a hydraulic actuator 29. The actuator 29 operates the clutch 21, and the mark space ratio of the signal fed into the valve 28 determines the flow rate and hence the hydraulic pressure in the actuator 29 and hence the state of engagement of the clutch. The actuator 29 is operated by the control loop so as to equalise the two signals Sc (or Sc') and Sp. Hence the state of engagement of the clutch is dictated by the size of the signal Sc'. The workings of the clutch position signal generator 16, and of the clutch control loop are fully explained in our published European Pat. No. 0 038 113 and form no part of this invention.

Figure 2:
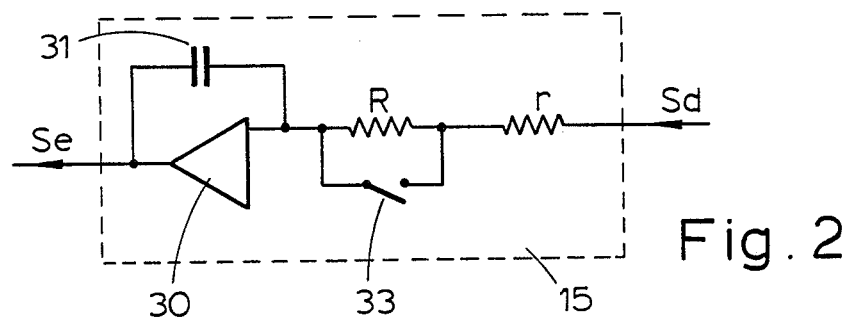
FIG. 2 is a disengagement control in its simplest form.

When the vehicle is being driven and the clutch is fully engaged the command signal Sc, from the clutch position generator 16 is fully positive and a signal Sd from the logic control 11 is negative. Now FIG. 2 shows the principle on which the disengagement control 15 operates. An integrating circuit has an amplifier 30 with an inverting input connected to the logic control signal Sd and its output signal Se is combined with the signal Sc. (See FIG. 1). When the signal Sd is negative the output signal Se from the amplifier 30 is positive. Since the signal Sc is fully positive and the signal Se is positive the clutch remains engaged. A diode 17 in connection between control 15 and the signal Sc prevents the signal Se from operating in both directions. When the logic control 11 changes the gear ratio, the signal Sd goes positive thereby forming a gear change signal and consequently the signal Se goes negative, and overrides the signal Sc to form signal Sc' causing the input to the comparator 22 to go negative and thereby causing the clutch 21 to immediately disengage. Since the state of engagement of the clutch depends upon the value of the command signal Sc' then disengagement of the clutch follows the changes in the amplifier output signal Se which overrides the signal Sc.

Figure 4:
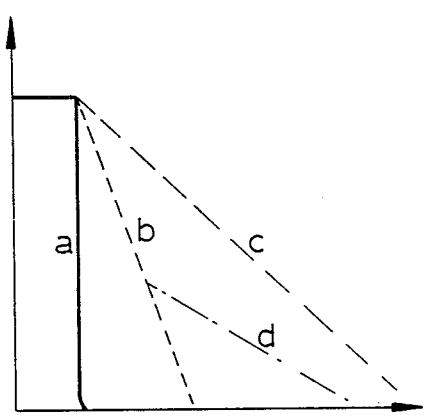
FIG. 4 is a graph of the amplifier output versus time.

Therefore, for a condition in which the signal Sc' goes immediately negative, curve (a) FIG. 4, the clutch will go from fully engaged to fully disengaged almost immediately. If a capacitor 31 is placed across the input and output of the amplifier 30 the rate at which the signal Se goes negative depends on the time taken for the charge on the capacitor 31 to change. The rate of change of the charge in the capacitor is dependent upon the total resistance in the charging circuit of the capacitor. With a small resistance r (approx. 50 kilo-ohm) in series with the amplifier 30 a rapid, but not instantaneous, change takes place, curve b.

If a large resistance R (approx. 500 kilo-ohms) is placed in the circuit then the rate of change of charge in the capacitor is slowed down, curve c. By utilising a switch 33 to place the resistor R in and out of the circuit at will the shape of the amplifier output versus time curve can be altered, for example curve d which shows the effect of the resistor R suddenly being placed in series with resistor r after a predetermined change in amplifier output. Thus by altering the resistance in-series with the amplifier 31 at will by switching the resistor R in and out of the circuit the shape of the position/time curve can be altered to suit the required circumstances.

The re-engagement of the clutch takes place when the logic control signal Sd goes negative, and then the reverse change in charge of the capacitor takes place.

Figure 3:
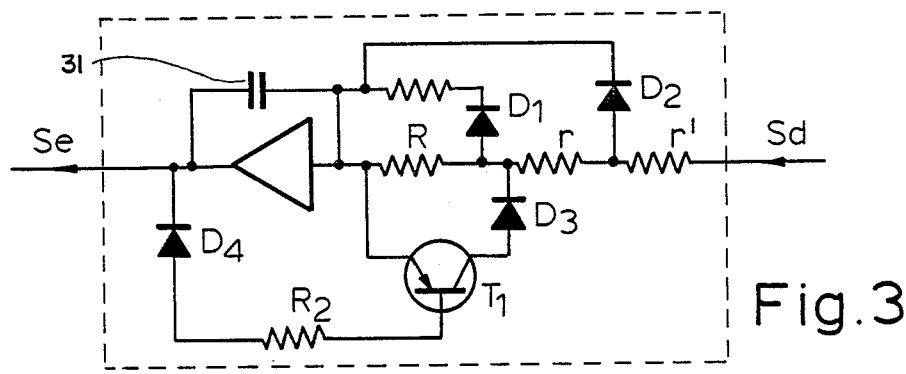
FIG. 3 is a preferred embodiment of the disengagement control.

FIG. 3 shows a more sophisticated gear change control 15. There are three resistance in series R,r, as for FIG. 2, and 4'. The resistance r' (approximately 10 kilo-ohms) is smaller than r. Diodes D1 and D2 allow the resistances R and r respectively to be shorted out when the current bias is in one direction. The switch 33 is replaced by the transistor $T_1$ which is opened and closed by a predetermined potential difference across the amplifier 30. The point at which the transistor $T_1$ is triggered is determined by the total potential drop across the two diodes D3 and D4, and the transistor $T_1$ together with the value of a resistor R2, placed between the transistor output and the amplifier 30.

Figure 5:
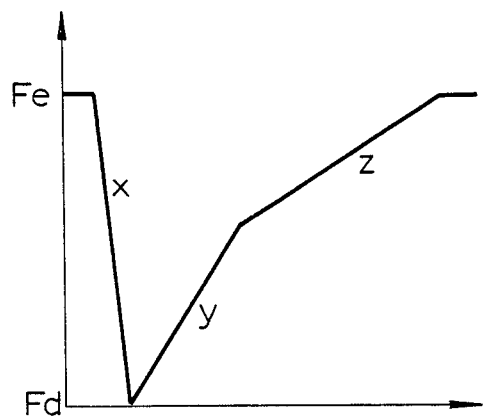
FIG. 5 is a graph of clutch position versus time curves between the fully engaged (FE) and fully disengaged (FD) during operation of the clutch during gear changes.

With reference also to FIG. 5, during a gear change when Sd goes positive to initiate the disengagement of the clutch, the rate of change of charge in the capacitor 31 depends solely on the resistor r' the other resistor R and r being shorted out of the signal path via the diodes D1 and D2 respectively. Since r' is small the disengagement is rapid following curve x of FIG. 5. When the signal Sd goes negative and the clutch begins to re-engage the bias of the diodes D1 and D2 ensures that the resistor R and r are now in the signal path.

However the transistor $T_1$ is switched on by the potential difference across the amplifier 30 and therefore the resistance of the capacitor charging circuit is effected only by the total resistance of the resistors r and r'. Therefore, the output signal Se becomes more positive and the clutch begins to re-engage at the rate shown by curve y. When the potential difference across the amplifier 30 reaches the trigger point, the transistor $T_1$ is switched off and the large resistance R is placed in the circuit so that the resistance of the capacitor charging circuit is now effected by the total resistance R and r and r'. Hence the re-engagement of the clutch is slowed, curve z, until the clutch is fully engaged.

I claim:

1. A vehicle transmission clutch control including:
   an electronic logic control means which is responsive to transmission operating parameters to control selection of the appropriate transmission gear ratio and which produces gear change signals to effect changes in gear ratios;
   a clutch position signal means responsive to vehicle operating parameters and producing a command signal;
   a clutch control means responsive to the command signal and which governs the state of engagement of the clutch;
   and a clutch disengagement control means responsive to a gear change signal from the logic control means and which produces an output signal which can override the command signal and cause the clutch control means to disengage the clutch, and said output signal is caused to vary during the gear ratio change period and thereby alter the command signal and cause the state of engagement of the clutch to vary over said period.

2. A control as claimed in claim 1, wherein the disengagement control means includes an integrator comprising: an amplifier which is connected to the logic control means via an inverting input, and which has its output connected to the command signal; and a capacitor connected across the amplifier output and said input, the disengagement control means being operated by said gear change signal which causes a change in polarity at the amplifier input, thereby causing a change in the charge in said capacitor and a subsequent change in said output signal.

3. A control as claimed in claim 2, wherein a resistance is provided in the amplifier input circuit upstream of the capacitor, and switch means are provided whereby said resistance can be switched into and out of said circuit once a predetermined change in amplifier output has taken place, thereby altering the total resistance of the capacitor charging circuit with a consequent alteration in the rate of change of charge in the capacitor.

4. A control as claimed in claim 3, wherein said switch means are a transistor sensitive to the potential difference between the amplifier input and output.

5. A control as claimed in claim 3 or claim 4 wherein said resistance comprises three resistors, namely a first resistor which is placed in a capacitor charging circuit when the gear change signal is operative, and a second and third resistor which are placed in the capacitor charging circuit when the gear change signal has ceased.

6. A control as claimed in claim 4, wherein said resistance comprises three resistors, namely, a first resistor which is placed in a capacitor charging circuit when the gear change signal is operative, and a second and third resistor which are placed in the capacitor charging circuit when the gear change signal has ceased and wherein the transistor switches one of the second and third resistors out of the capacitor charging circuit when the gear change signal has ceased and a predetermined potential difference has been reached.

* * * * *